United States Patent
Coffey et al.

(10) Patent No.: US 6,826,714 B2
(45) Date of Patent: Nov. 30, 2004

(54) DATA GATHERING DEVICE FOR A RACK ENCLOSURE

(75) Inventors: Aedan Diarmuid Cailean Coffey, Kilkenny (IE); Hans O'Sullivan, Kilmacanogue (IE); Derek Christopher Harnett, Stillorgan (IE)

(73) Assignee: Richmount Computers Limited, Dublin (IE)

( * ) Notice: Subject to any disclaimer, the term of this patent is extended or adjusted under 35 U.S.C. 154(b) by 574 days.

(21) Appl. No.: 09/900,214

(22) Filed: Jul. 6, 2001

(65) Prior Publication Data

US 2002/0054477 A1 May 9, 2002

(30) Foreign Application Priority Data

Jul. 6, 2000 (IE) .......................................... S2000/0546
Sep. 7, 2000 (IE) .......................................... S2000/0706

(51) Int. Cl.[7] .............................................. G06F 11/00
(52) U.S. Cl. .............................. 714/25; 714/47; 714/48; 702/188
(58) Field of Search .............................. 714/25, 27, 37, 714/44, 47, 48; 702/188

(56) References Cited

U.S. PATENT DOCUMENTS

| | | | | |
|---|---|---|---|---|
| 5,500,940 A | * | 3/1996 | Skeie ........................... | 714/25 |
| 5,819,028 A | * | 10/1998 | Manghirmalani et al. ..... | 714/57 |
| 5,890,214 A | * | 3/1999 | Espy et al. .................. | 711/114 |
| 5,966,510 A | * | 10/1999 | Carbonneau et al. ......... | 714/44 |
| 6,018,809 A | | 1/2000 | Garrett | |
| 6,122,758 A | * | 9/2000 | Johnson et al. ................ | 714/47 |
| 6,148,418 A | * | 11/2000 | Wang et al. ................... | 714/25 |
| 6,188,973 B1 | * | 2/2001 | Martinez et al. ............ | 702/188 |
| 6,308,289 B1 | * | 10/2001 | Ahrens et al. ................ | 714/48 |
| 6,510,532 B1 | | 1/2003 | Pelly et al. | |
| 6,513,074 B1 | | 1/2003 | Dimitri et al. | |
| 6,532,552 B1 | * | 3/2003 | Benignus et al. .............. | 714/25 |
| 6,564,276 B1 | * | 5/2003 | Tyner .......................... | 710/260 |
| 6,629,062 B2 | * | 9/2003 | Coffey et al. ................ | 702/188 |
| 2002/0038387 A1 | * | 3/2002 | Fuiks et al. .................. | 709/313 |
| 2002/0044562 A1 | | 4/2002 | Killen et al. | |
| 2002/0046276 A1 | | 4/2002 | Coffey et al. | |
| 2002/0054477 A1 | | 5/2002 | Coffey et al. | |
| 2003/0051194 A1 | | 3/2003 | Cabezas et al. | |

OTHER PUBLICATIONS whatis.com.definition of intelligent device.Apr. 6, 2002.*

* cited by examiner

*Primary Examiner*—Robert Beausoliel
*Assistant Examiner*—Yolanda L Wilson
(74) *Attorney, Agent, or Firm*—Oppedahl & Larson LLP

(57) ABSTRACT

A data gathering device for a rack enclosure which is, in use, cooperable with at least one SES processor, each processor being incorporated in a respective plug-in card. The data gathering device comprises at least one port adapted to communicate with a respective environmental services processor, a plurality of data inputs and a plurality of controllable outputs. The data gathering device is adapted to generate and send, to an SES processor responsible for the enclosure, a message reporting the state of the data inputs and to receive, from the responsible SES processor, a message including a command determining the state of one of the controllable outputs.

3 Claims, 1 Drawing Sheet

DATA GATHERING DEVICE FOR A RACK ENCLOSURE

RELATED APPLICATIONS

This application relates to co-pending application no. S2000/0707 filed on Sep. 7, 2000 entitled "A Protocol for a Power Supply Unit Controller" naming Barrie Jeremiah Mullins et al as inventors; to co-pending application no. S2000/0708 filed on Sep. 7, 2000 entitled "Improved Power Supply Unit Controller" naming Barrie Jeremiah Mullins et al as inventors; to co-pending application no. S2000/0709 filed on Sep. 7, 2000 entitled "Performance Monitoring in a Storage Enclosure" naming Aedan Diarmid Cailean Coffey et al as inventors; to co-pending application no. S2000/0710 filed on Sep. 7, 2000 entitled "Fibre Channel Diagnostics in a Storage Enclosure" naming Aedan Diarmid Cailean Coffey et al as inventors; and to co-pending application no. S2000/0711 filed on Sep. 7, 2000 entitled "CrossPoint Switch for a Fibre Channel Arbitrated Loop" naming Aedan Diarmid Cailean Coffey as inventor.

FIELD OF THE INVENTION

The present invention relates to a data gathering device for monitoring environmental parameters within a rack enclosure housing one or more storage devices.

BACKGROUND OF THE INVENTION

In a rack enclosure comprising a backplane into which a number of devices such as storage devices and/or an associated controller as well as power supplies and fans are connected, monitoring environmental conditions is important so that errors or potential failure of a system can be detected as soon as possible. This helps to maintain the high availability of data required of storage subsystems. Environmental data may be gathered directly from devices, such as fans or power supplies to indicate their presence/absence and their operating state, or from one or more thermometers to indicate if an enclosure is overheating for some reason. Within the rack enclosure environmental condition indicators include LED's, buzzers etc.

For rack enclosures housing Small Computer Systems Interface (SCSI) devices based on media such as parallel SCSI or Fibre-Channel, enclosure services protocols have been developed enabling a controller housed within a rack enclosure to reliably communicate environmental information with a host systems management application, enabling remote monitoring and control of a rack enclosure. This system's management application then notifies an operator in the event of a failed component or any other preconfigured alarmed event.

Such conventional environmental monitoring typically includes all the environmental monitoring hardware, including an enclosure management controller on a plug-in card, thus there are very high pin count (and expensive) connectors between the backplane and the monitoring devices located around the rack enclosure. As rack enclosures get bigger and more complex this problem gets worse and worse.

If on the other hand, environmental monitoring hardware is included exclusively on the backplane, any failure means that the system must be brought down to replace the backplane, and this may be intolerable from an availability point of view.

DISCLOSURE OF THE INVENTION

According to the present invention there is provided a data gathering device for a rack enclosure which is, in use, cooperable with at least one environmental services processor, each processor being incorporated in a respective plug-in card, said data gathering device comprising at least one port adapted to communicate with a respective environmental services processor, a plurality of data inputs and a plurality of controllable outputs, said data gathering device being adapted to generate and send, to a one of said at least one environmental services processors responsible for said enclosure, a message reporting the state of said data inputs and to receive, from said responsible environmental services processor, a message including a command determining the state of one of said controllable outputs.

In a second aspect of the invention there is provided a backplane for a rack enclosure, said backplane including one or more data gathering devices, each data gathering device being, in use, cooperable with at least one environmental services processor, each processor being incorporated in a respective plug-in card, each data gathering device comprising at least one port adapted to communicate with a respective environmental services processor, a plurality of data inputs and a plurality of controllable outputs, each data gathering device being adapted to receive an instruction from a one of said at least one environmental services processors responsible for said enclosure to take responsibility for data gathering, said data gathering device being adapted, when responsible for said enclosure, to generate a message reporting the state of said data inputs to said responsible environmental services processor and to receive a message including a command from said responsible environmental services processor determining the state of one of said controllable outputs.

In a further aspect of the invention there is provided a rack enclosure system comprising a backplane including one or more data gathering devices and at least one plug-in card incorporating a respective environmental services processor, each data gathering device comprising at least one port adapted to communicate with a respective environmental services processor, a plurality of data inputs and a plurality of controllable outputs, each data gathering device being adapted to receive an instruction from a one of said at least one environmental services processors responsible for said enclosure to take responsibility for data gathering, said data gathering device being adapted, when responsible for said enclosure, to generate a message reporting the state of said data inputs to said responsible environmental services processor and to receive a message including a command from said responsible environmental services processor determining the state of one of said controllable outputs.

Preferably, said backplane is adapted to receive fibre channel storage devices and said data gathering device includes at least one port adapted to communicate with a respective one of said storage devices, said data gathering device being adapted to relay environmental services requests from a host application received via a storage device to said responsible environmental services processor and to relay responses from said responsible environmental services processor to said storage device.

Preferably, said data gathering device includes two ports, each adapted to communicate with a respective one of two environmental services processors.

The present invention mitigates the problems of the prior art by putting data gathering and control functions on the backplane, thus replacing many signal lines with, for example, a three wire serial bus. By moving the data gathering function to the backplane the pin count of the connectors can be significantly reduced.

Thus, using the invention connector costs are reduced for shelves of a similar size. Alternatively, since the shelves are always getting bigger, the invention allows more modules to be integrated together on one card with a similar connector size.

The invention offers a high degree of flexibility based on population options thus requiring minimal duplicate software and even hardware development.

In the preferred embodiment, the backplane is adapted to receive two enclosure services cards, each connected to a respective data gatherer device and cross-connected to another data gatherer device. This means that in spite of introducing data gathering circuitry onto the backplane, no single point of failure is introduced. Nonetheless, should this level of redundancy not be required, then only one data gatherer device socket need be populated on the backplane and only one enclosure services card need be provided for the backplane.

BRIEF DESCRIPTION OF THE DRAWINGS

Embodiments of the invention will now be described with reference to the accompany drawings, in which.

DESCRIPTION OF THE PREFERRED-EMBODIMENT

Figure 1:
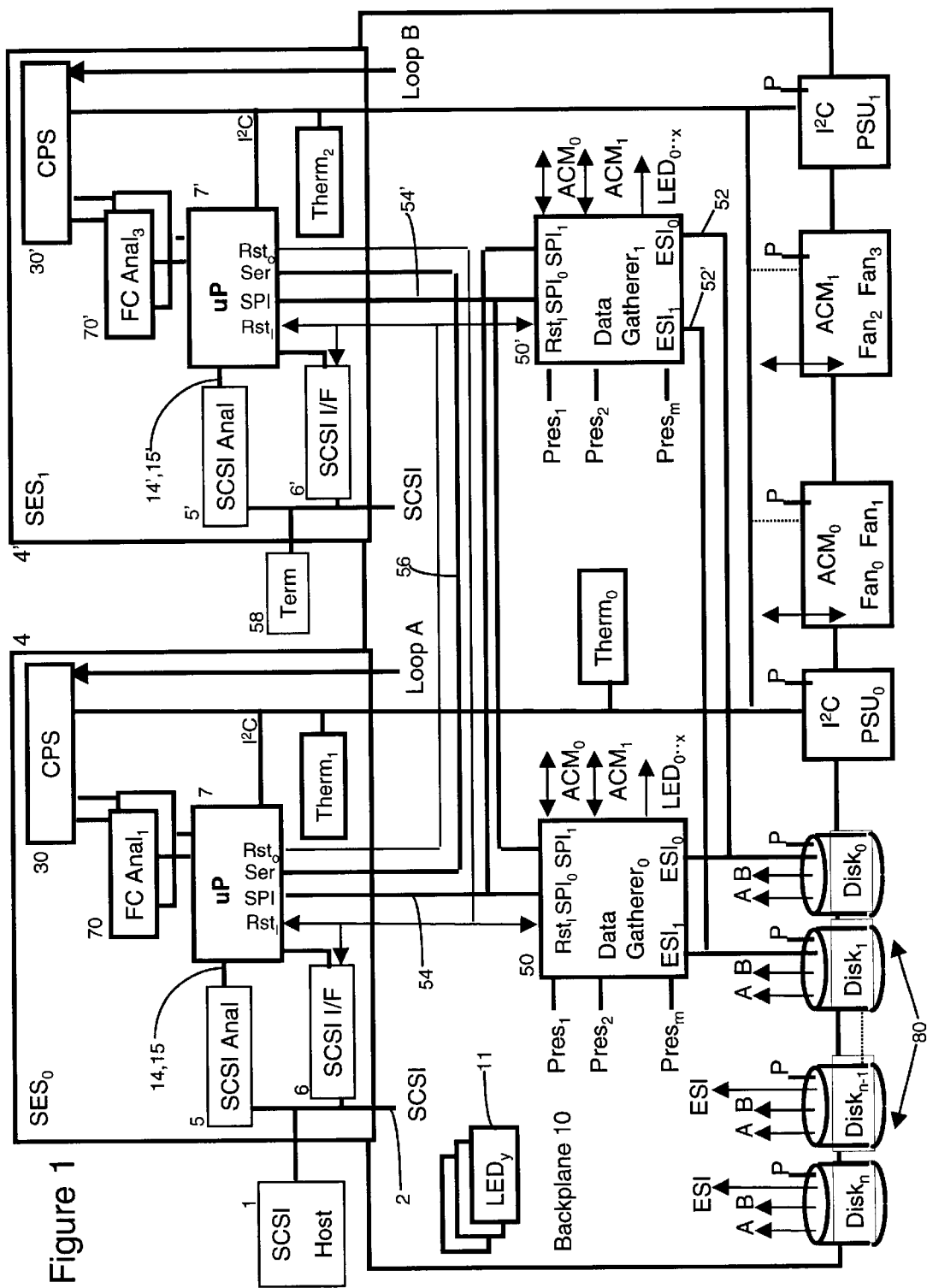
FIG. 1 is a block diagram illustrating a backplane incorporating a pair of data gathering devices according to the present invention.

Referring now to FIG. 1, where a preferred embodiment of the invention is illustrated, a backplane 10 suitable for being housed in a 19" 3U rack/shelf is shown schematically. For clarity, detail such as tracking or peripheral devices such as memory chips have been omitted where this detail is not necessary for describing the present invention.

In the preferred embodiment, up to two data gathering devices 50, 50' are incorporated on the backplane to monitor and control environmental conditions in the enclosure or, in this case, one shelf in a multi-shelf enclosure.

The backplane further includes a pair of edge connectors (not shown), each adapted to receive one of a potential pair of plug-in enclosure services processor cards 4, 4', each including a respective processor 7,7'. In the present embodiment, the processor operates according to the SCSI Enclosure Services protocol (SES) and so the cards are labelled $SES_0$, $SES_1$, although it will be seen that the invention is not limited to this protocol. Such processors may support, for example, SCSI Accessed Fault-Tolerant Enclosure (SAF-TE), SCSI Enclosure Services (SES) or Intelligent Platform Management Interface (IPMI) enclosure management protocols.

One or more of a range of SES Processor cards 4,4' can be plugged in and populated to provide advanced features, such as Ethernet, Direct Attach Fibre or Simple Network Management Protocol (SNMP). Where two cards are used redundancy is provided as explained below.

A further plurality of edge connectors (not shown) are mounted on the backplane, and a set of disk drives 80 are inserted into associated slots in the rack system where they connect at their rear to respective edge connectors and are thus interconnected via the backplane. The disk drives of the preferred embodiment are Fibre Channel based disks, however, as will be seen, the invention is not limited to Fibre Channel devices. Such disks include two pairs of fibre channel ports, each pair connecting to a respective one of a pair of Fibre Channel-Arbitrated Loops (FC-AL) designated Loop A and Loop B. Each disk further includes an Enclosure Services Interface (ESI) port (also more properly known as SFF-8067. SFF=Small Form Factor). This is conventionally used to provide communication between each disk and an enclosure services processor located on either a card connected to the backplane or even incorporated on the backplane.

In the case of the preferred embodiment, however, two of the disk slots in each backplane are connected via respective 4 track sets of circuit traces 52, 52' to one of two ESI ports on each of the data gatherer devices 50, 50'. Thus the slot for $Disk_0$ connects to $ESI_0$ of both data gatherer devices 50 and 50', and the slot for $Disk_1$ connects to $ESI_1$ of both data gatherer devices 50 and 50'.

Where a fibre channel medium is used, a host application (not shown) communicates with each of the disks 80 via one of the fibre channel loops. When the host application wishes to send and receive enclosure services information, for example, using the SES protocol, it sends a request to a pre-determined one of $Disk_0$ or $Disk_1$. When the receiving disk processes the request, it determines that the request is an enclosure services request and forwards this request through its ESI port.

In the preferred embodiment, the ESI interfaces for the remaining $Disks_{2...n}$ connected to the backplane 10 do not connect directly to the data gatherer devices. (N is typically 12 for a 19" rack housing 12 disks.) Without further circuitry, this forces one of the slots for $Disk_0$ or $Disk_1$ to be populated if enclosure services are to be controlled and monitored from the host application—otherwise the enclosure services processor operates autonomously. It is nonetheless possible to provide, for example, an additional device on the backplane which is connected to each of the ESI ports for $Disks_{2...n}$ and which multiplexes communication with these disks into a single ESI or equivalent bus connecting to either an additional port on the data gatherer devices 50, 50' or even directly to the enclosure services processor.

In any case, each data gatherer device 50, 50' incorporates two Serial Peripheral Interface ports $SPI_0$ and $SPI_1$. On receiving a request on an ESI port, a data gatherer 50, 50' may then communicate the request to one of the two enclosure services processors 7,7' via one of two three wire SPI busses 54, 54' connected to $SPI_0$ and $SPI_1$ ports respectively. Similarly, responses from the enclosure services processors 7,7' are relayed to the host application via the data gatherer devices 50,50'.

Each processor 7,7' includes a further serial port (SER). The SER ports are interconnected via a two wire serial bus 56, and this is used by the two processors 7,7' to arbitrate between one another as to which will be responsible for the provision of enclosure services. In the present embodiment, the processors communicate using an RS-232 protocol, however, only 5V signalling is used, as the 12V required by conventional RS-232 would require an additional supply voltage to be used by the processors 7,7'.

The responsible processor 7,7' can operate in one of two modes:

Standalone (autonomous) mode, where it operates alarms and LED's without any outside interaction other than from a mute switch (not shown) housed within the enclosure; or Non-redundant mode, where it reports status to and receives commands from the host application out-of-band via an RS-232 connection (not shown) or in-band via ESI (Enclosure Services Interface) for fibre channel or directly over parallel SCSI. (In any case, if no communications are received from the host for a certain length of time operation reverts to standalone mode.)

Note that while both ESI based and parallel SCSI (hatched) communications are shown in FIG. 1, only one of these would be used in any particular product.

Where the backplane is used for parallel SCSI devices, the processors 7,7' share a SCSI identifier (or they may each have an individual identifier) and communicate with a SCSI host application 1 directly across a SCSI bus 2. To enable this communication, a SCSI interface chip socket 6 is populated—unless either standalone use or out-of-band reporting is used. The presence of the SCSI bus on the SES processor cards 4,4' enables the bus to be extended to a connector on the cards to allow on the one hand a computer running the SCSI host application 1 to connect to the SCSI bus via the processor card 4 and on the other hand a terminator 58 to connect to the end of SCSI bus via the processor card 4' (or vice versa).

Again, because of the presence of the SCSI bus on the processor cards 4,4', it is also possible to incorporate a SCSI analyser 5,5' disclosed co-pending application entitled "Performance Monitoring in a Storage Enclosure" naming Aedan Diarmid Cailean Coffey et al as inventors into the processor card. In the present embodiment, each processor 7,7' is connected to a respective SCSI analyser 5,5', via a dedicated serial connection comprising two lines 14,15; and 14'15'. This means that whichever processor takes responsibility for the shelf will be reporting the results from its associated SCSI analyser.

On the other hand, where a fibre channel medium is employed, for each disk 80, each of the sending and receiving ports for loop A and loop B are brought onto processor card 4 and 4' respectively. Conventionally a loop bypass circuit is employed to connect each disk in a loop and to bypass ports where no disk is inserted in the slot. This, however, limits the configuration of the disks in the loop to the physical order in which they are inserted into slots in the rack.

In the preferred embodiment, however, a cross-point switch 30,30' as described in co-pending application entitled "Cross-Point Switch for a Fibre Channel Arbitrated Loop" naming Aedan Diarmid Cailean Coffey as inventor is used to connect each of the disk sending ports to a receiving port of another disk in one of Loops A or B in a configurable manner. Thus, disks (or repeaters or retimers if necessary) may be ordered in either loop in any desirable manner and furthermore, they may be spaced apart in the loop in a manner that smoothes the signal level throughout the loop. It should also be seen that because each disk sending and receiving port in a Loops A and B are connected to respective processor cards 4,4', it is possible to include one or two Fibre-Channel Analysers 70,70' as described in copending application entitled "Fibre Channel Diagnostics in a Storage Enclosure" naming Aedan Diarmid Cailean Coffey et al as inventors on the processor cards 4,4'.

A further advantage to using a cross-point switch is that the fibre channel analysers can be connected to the fibre channel Loops A and B but need not be in the loops in the manner of a fibre channel device, so affecting the operation of the loop they are analysing.

In order to configure the cross-point switches 30,30', the processor 7,7' responsible for the shelf needs to determine which disks are present. In common with all other devices plugged into the backplane, each disk 80 includes a present output P. Each present output P is connected to one of a series of $Pres_1 \ldots _m$ inputs (where m is greater than the number of disks N) on each of the data gatherer devices 50,50'. Whichever of the data gatherers 50,50' is enabled (explained later) reports which disk slots are occupied to the responsible processor 7,7' via its SPI port connecting the gatherer 50,50' to the responsible processor 7,7'. Both the processors 7,7' and the cross-point switches 30,30' include respective serial ports inter-connected via an I²C bus. The I²C bus also extends across the backplane to in turn interconnect the processors and switches via the backplane allowing each cross-point switch 30,30' to be addressed from either processor 7,7'.

The responsible processor 7,7' can thus determine the switches which are to be closed to link each of the disks 80 in respective Loops A and B and relays this information to the cross-point switches 30,30' via the I²C bus.

If the responsible processor 7,7' is in communication with a host application, then the operator using the host application may specify where in the Loops A or B, the fibre channel analysers 70,70' are to be located. On receiving such a request the responsible processor 7,7' again determines which further cross-point switches are to be closed to locate the fibre channel analysers in either of Loops A or B and this is relayed to the appropriate cross-point switch 30,30' via the I²C bus. As described in co-pending application entitled "Fibre Channel Diagnostics in a Storage Enclosure" naming Aedan Diarmid Cailean Coffey et al as inventors each analyser 70,70' is connected via a respective bus to a port on the processor 7,7'. Data returned from the analysers 70,70' can only be collated by the responsible processor 7,7' and returned to the host application as required. Thus, if the host application specifically wishes analysis of the loop connected to the non-responsible processor card 4,4', it must instruct the responsible processor to transfer responsibility to the other processor, if this is possible.

Reverting now to the operation of the processors 7,7', once arbitration is complete and a responsible processor determined, the responsible processor 7,7' then instructs an associated data gatherer device 50,50' to in turn take responsibility for the gathering of input data and the control of enclosure outputs.

In the present example, processor 7 is associated with data gatherer device 50 and processor 7' is associated with data gatherer device 50'. $SPI_0$ on each data gatherer 50,50' is connected via busses 54,54' to the SPI port on its associated processor 7,7', whereas $SPI_1$ is cross-connected to the other of the processors SPI port again via busses 54,54'.

If, for example processor 7 takes responsibility, by default, processor 7' and data gatherer 50' go into a "dead till enabled" standby mode. In this case, SES requests sent from either of $Disk_1$ or $Disk_0$ are received and forwarded by data gatherer 50. If the data gatherer 50 is being controlled by its default processor 7, then it relays the SES request via port $SPI_0$ to the processor 7.

If processor 7 for some reason fails, then the other processor 7' and its associated data gatherer 50' will take over responsibility for environmental monitoring. In the preferred embodiment, each processor 7,7' and data gatherer device 50, 50' includes a watchdog timer which, if it detects failure of its controlling device, should cause the device to take itself out of service.

As an additional measure each processor 7 includes an input and output reset port $RST_I$ and $RST_O$ respectively, each data gatherer device includes an $RST_I$ port and each SCSI Interface chip includes an input reset port (not labelled). The $RST_O$ port of the processor 7 is connected to the $RST_I$ ports of the processor 7', the data gatherer 50' and the SCSI I/F chip 6' and vice versa. This enables either the processor 7 or 7' to force the backplane electronics into reset if it thinks that the other processor, its associated gatherer device or where populated the SCSI I/F may be causing the backplane to fail.

It will be seen that in the case of failure of one of processors 7,7' and/or one of gatherers 50, 50', the host application, although it can be notified of the failure, will not be affected, as it can still send its requests via the same disk from which the requests will be picked up by data gatherer 50' and relayed to processor 7'.

If a situation occurs where, say processor 7 and data gatherer 50' fail, then it will be seen that processor 7' will again take over responsibility, however, when it instructs a data gatherer that it has responsibility, the instruction will be picked up by data gatherer 50 through its port $SPI_1$ and data gatherer 50 will assume responsibility. Again, the host application will be unaffected, and so it will be seen that from host to enclosure services processor, eight possible paths exist, with no single point of failure on these paths, and with this arrangement each processor 7,7' can control it's own and the other processor's access to the SPI busses 54,54'.

Nonetheless, while the preferred embodiment shows two data gatherer devices included on the backplane, this level of redundancy may not be required by some and it will be seen that if only one device 50, 50' is provided on the backplane, then this will be detected by whichever of up to two plugged-in processors 7,7' gets control of the backplane, and it will simply operate with a potential single point of failure on the backplane.

Turning now to the type of data monitored and controlled by the processors 7,7'. In the preferred embodiment, as well as the present inputs $Pres_{1 \ldots n}$ received from the disks 80, each other device connected to the backplane has a present (or equivalent) output P which is connected to a respective one from the remainder of the $Pres_{1 \ldots m}$ inputs on each of the data gatherer chips 50,50'.

In the present embodiment, these devices include two power supply units $PSU_0$ and $PSU_1$ for each shelf whose operation is described in co-pending application entitled "A Protocol for a Power Supply Unit Controller" naming Barrie Jeremiah Mullins et al as inventors; and co-pending application entitled "Improved Power Supply Unit Controller" naming Barrie Jeremiah Mullins et al as inventors.

Data is gathered by the processor 7,7' directly from respective controllers within the power supplies via the same $I^2C$ bus connecting the processors 7,7' to the cross-point switches 30,30'. Each power supply's P output represents a PSU_OK signal which indicates to the data gatherer 50,50' both that the PSU is present and that it is operating correctly in all ways. If the $I^2C$ bus fails, the PSU_OK signals can still be monitored through the data gatherers 50,50' but detailed information cannot be read. Thus it is possible to identify a failing PSU, but not to diagnose the failure. In the meantime, the PSU firmware operates in autonomous mode and set it's fault LED.

In any case, the data gathering device autonomously controls delayed spinup of the disks—fibre channel or parallel SCSI—based on the two power supplies reporting themselves as present and working OK, thus avoiding any timing issues regarding how soon delayed_spinup signals (not shown) must be asserted after power up. On power up both data gathering devices remain inactive (i.e. all outputs tristate, except delayed_spinup) until enabled by the responsible processor 7,7'. Alternatively, if the power supplies are powerful enough to support spinning up all the disks at the same time, there is no need to implement a delayed spinup system.

Each PSU further includes a thermometer (not shown) which is also connected to and addressable on the $I^2C$ bus. Further thermometers $Therm_0$, $Therm_1$ and $Therm_2$ are located on the backplane, processor card 4 and processor card 4' respectively and connect to and are independently addressable on the $I^2C$ bus by whichever processor 7,7' has responsibility for the shelf.

Each shelf also includes two advanced cooling modules ($ACM_0$ and $ACM_1$) each including 2 fans $Fan_0$ and $Fan_1$. In the preferred embodiment, these are conventional style modules whose fan speed is measured and controlled through respective input/output ports $ACM_0$ and $ACM_1$ on each of the data gatherers 50,50'. Again these modules include a present output P connected to respective Pres inputs on each of the data gatherers 50,50'. In an alternative embodiment, the ACMs could also include controllers corresponding to those of the PSUs and be directly accessible to the processors 7,7' via the $I^2C$ bus. This would obviate the need for the input/output lines on the data gatherer 50,50' without requiring further pins on the processor card 4,4' edge connector. Again in this case, if the $I^2C$ bus is brought down then the fans operate in autonomous mode. If they detect a failure they set their error LED's (not shown) but the host, via the processor 7 or 7', will not know about it.

Each data gatherer 50,50' also includes at least 37 LED outputs $LED_{0 \ldots x}$ (3 LEDS for 12 disk drives plus one fault LED). The backplane also includes miscellaneous LED's $LED_{1 \ldots y}$ which are controlled from respective outputs of the outputs $LED_{0 \ldots x}$. Each gatherer further contains a programmable LED flash generator to allow customisation for various LED flash patterns.

Data from all other inputs is gathered directly via either other Pres inputs or general purpose inputs (not shown) on the data gatherers 50,50'. The responsible data gatherer 50, then makes this data available to the responsible processor 7,7' via the appropriate SPI bus 54,54'. These general purpose input and also output pins also allow the hardware to operate with additional features of future backplane releases by simply upgrading gatherer software.

The data gathering device has several features to accommodate redundancy, such as:

All control outputs being open drain to prevent damage in the event that both data gathering devices get enabled at the same time;

All outputs being held in tri-state if the reset pin is asserted; and

All outputs except delayed_spinup being held in tri-state once reset is deasserted until a specific command has been received to enable them.

It is acknowledged that in the present embodiment, since power supplies and possibly ACMs only have one $I^2C$ interface there cannot be full redundancy in the monitoring system. Thus, there exists a possibility of a faulty device such as a microcontroller, fan, power supply, etc. bringing the main $I^2C$ bus down and disabling all communications. Although the invention is not limited to such a single bus, nonetheless, in the single bus case, the data gatherer can still receive the hardwired present outputs and the devices themselves can autonomously set any of their on-board error LED outputs or buzzers.

In the case of the two SPI interfaces on the data gathering chip, these operate independently such that a failure on one will not result in a failure on the other. Since a high degree of reliability can be expected of the data gathering device and since it is independent of the main $I^2C$ bus, it can thus be used to control segmentation of the $I^2C$ bus to remove faulty devices.

While the preferred embodiment has been described in terms of specific busses, it will be seen that any bus can be replaced by any functionally equivalent bus, serial or parallel, according to the performance requirements of the system. So for example, the I²C bus could be replaced with a faster three wire serial bus (SPI bus).

Other features of the data gatherers which, although not required by the invention, could be included are:

General inputs to support product ID, shelf ID or cabinet ID; and

Support for one or more buzzers (with programmable beep patterns).

So, it will be seen that a data gatherer chip equally useful either individually or in a pair on any backplane with complaint tracking is provided by the invention. The chip in turn operates with an enclosure services processor, again equally useful either individually or as one of a pair, within one of a range of processor cards again with compliant tracking which can be selectively populated to provide desired functionality.

In both cases designing for example parallel SCSI or fibre channel versions of the card 4,4' or backplane 10 with compliant tracking enables the same chips 7,7',50,50' to be used, so reducing development overhead. This simply means that where, for example, the data gatherer is used for parallel SCSI, the ESI ports do not receive signals. Similarly, where the processor 7,7' is used for fibre channel, the SCSI analyser and SCSI interface ports do not receive signals. Again, where the processor 7,7' is used for parallel SCSI, the fibre channel analyser ports do not receive signals and neither would a cross-point switch be addressable on the I²C bus.

What is claimed is:

1. A data gathering device for a rack enclosure which is, in use, cooperable with at least one environmental services processor, each processor being incorporated in a respective plug-in card, said data gathering device comprising at least one port adapted to communicate with a respective environmental services processor, a plurality of data inputs and a plurality of controllable outputs, said data gathering device being adapted to generate and send, to a one of said at least one environmental services processors responsible for said enclosure, a message reporting the state of said data inputs and to receive, from said responsible environmental services processor, a message including a command determining the state of one of said controllable outputs, wherein said data gathering device includes two ports, each adapted to communicate with a respective one of two environmental services processors.

2. A backplane for a rack enclosure, said backplane including one or more data gathering devices, each data gathering device being, in use, cooperable with at least one environmental services processor, each processor being incorporated in a respective plug-in card, each data gathering device comprising at least one port adapted to communicate with a respective environmental services processor, a plurality of data inputs and a plurality of controllable outputs, each data gathering device being adapted to receive an instruction from a one of said at least one environmental services processors responsible for said enclosure to take responsibility for data gathering, said data gathering device being adapted, when responsible for said enclosure, to generate a message reporting the state of said data inputs to said responsible environmental services processor and to receive a message including a command from said responsible environmental services processor determining the state of one of said controllable outputs, wherein the backplane is adapted to receive two enclosure services cards, each connected to a respective data gatherer device and cross-connected to another data gatherer device.

3. A backplane according to claim 2 wherein the backplane is adapted to receive fibre channel storage devices and said data gathering device includes at least one port adapted to communicate with a respective one of said storage devices, said data gathering device being adapted to relay environmental services requests from a host application received via a storage device to said responsible environmental services processor and to relay responses from said responsible environmental services processor to said storage device.

* * * * *